United States Patent
Yamashita

(10) Patent No.: US 9,563,164 B2
(45) Date of Patent: Feb. 7, 2017

(54) INFORMATION PROCESSING DEVICE AND INFORMATION PROCESSING METHOD

(71) Applicant: Oki Data Corporation, Tokyo (JP)

(72) Inventor: Makoto Yamashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/750,168

(22) Filed: Jun. 25, 2015

(65) Prior Publication Data
US 2015/0379384 A1 Dec. 31, 2015

(30) Foreign Application Priority Data

Jun. 26, 2014 (JP) .................................. 2014-130859

(51) Int. Cl.
| | |
|---|---|
| *G06K 15/02* | (2006.01) |
| *G06K 15/00* | (2006.01) |
| *G03G 15/00* | (2006.01) |
| *H04N 1/00* | (2006.01) |

(52) U.S. Cl.
CPC ............ *G03G 15/502* (2013.01); *G03G 15/50* (2013.01); *H04N 1/00411* (2013.01); *H04N 1/00482* (2013.01)

(58) Field of Classification Search
CPC .................. G06K 15/4055; G06K 15/1885
See application file for complete search history.

(56) References Cited

U.S. PATENT DOCUMENTS

| | | | |
|---|---|---|---|
| 2006/0221372 A1* | 10/2006 | Onishi | G06F 3/1204 358/1.13 |
| 2011/0292446 A1* | 12/2011 | Kojima | G03G 15/5004 358/1.15 |
| 2015/0254539 A1* | 9/2015 | Fujita | G06F 3/1208 358/1.2 |

FOREIGN PATENT DOCUMENTS

JP 2001-154786 A 6/2001

* cited by examiner

*Primary Examiner* — Iriana Cruz
(74) *Attorney, Agent, or Firm* — Panitch Schwarze Belisario & Nadel LLP

(57) ABSTRACT

An information processing device includes a storage unit, a display unit, and a control unit. The storage unit stores a selection value indicating whether a predetermined setting is enabled or disabled, and a setting value that applies when the setting is enabled. The display unit displays a setting screen concerning the predetermined setting. When a user gives an instruction to switch to display of the setting screen, even if the selection value stored in the storage unit indicates that the predetermined setting is disabled, the control unit causes the display unit to display the setting screen and causes the selection value displayed on the setting screen to indicate that the predetermined setting is enabled, so that the user does not have to perform a separate operation to enable it.

19 Claims, 7 Drawing Sheets

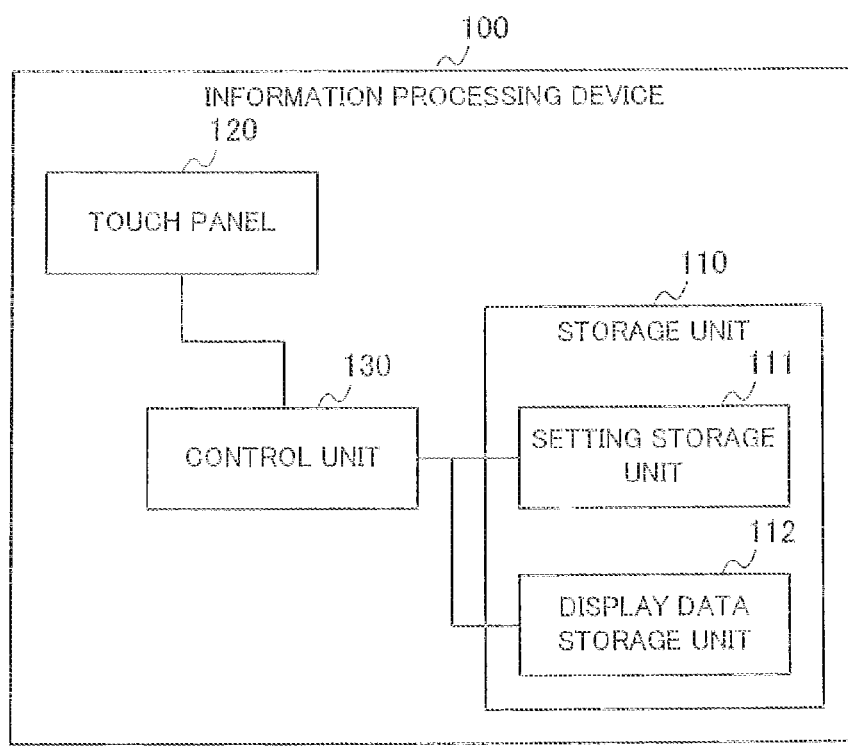

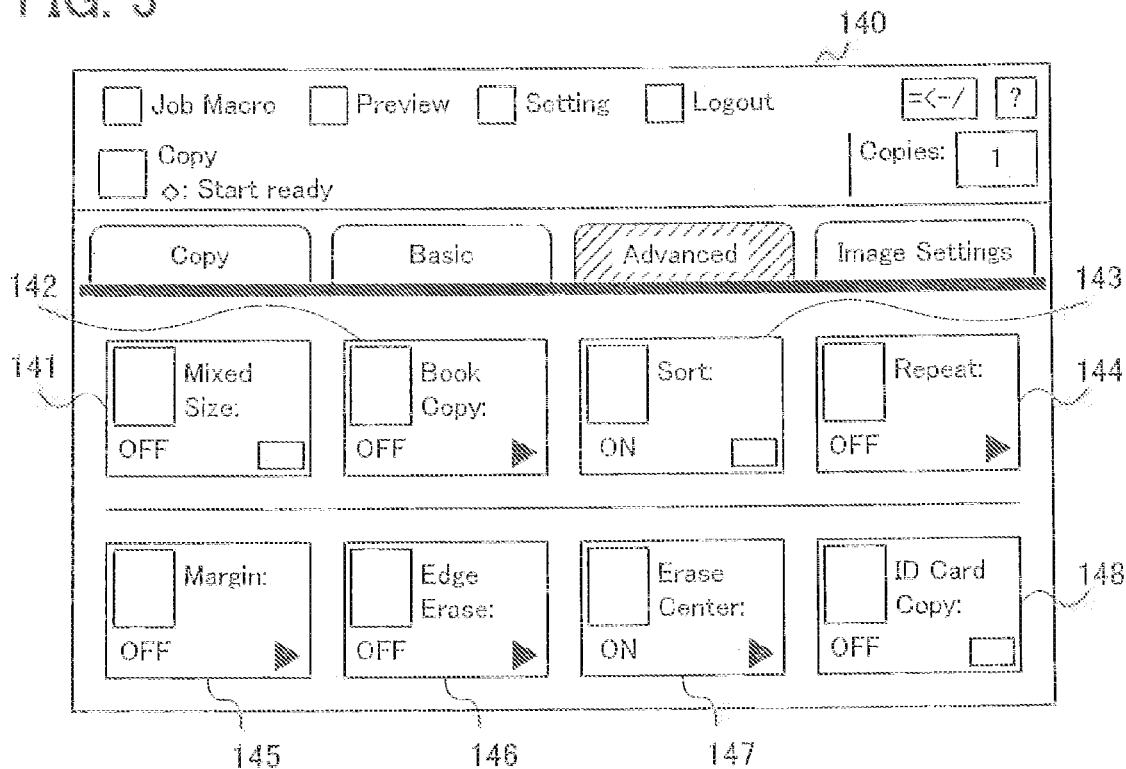

INFORMATION PROCESSING DEVICE AND INFORMATION PROCESSING METHOD

BACKGROUND OF THE INVENTION

1. Field of the Invention

This invention relates to an information processing device and an information processing method.

2. Description of the Related Art

Information processing devices often perform particular processing based on the input of numerical values. Information processing devices equipped with means for receiving input of numerical values are therefore well known.

Information processing devices have on-states and off-states, and often control the settings for numerical values that are set are frequently enabled only in the on-state. For example, the time setting of an alarm in an alarm clock is enabled only in the alarm-on state. The settings of this type are referred to below as the settings applying numerical, values only in the on-state. When the information processing devices of this type control the settings applying numerical values only in the on-state, normally the operation to switch between the on-state and the off-state and the operation to input numerical values must be carried out separately on a setting screen.

In such cases, when a user makes the setting screen for a setting of this type displayed, the user generally intends to use the setting, so it is annoying to have to perform a separate operation to switch the setting on. A further annoyance is that when the setting is switched from on to off on the setting screen, the setting screen remains on display, even though the user does not intend to make further use of it, and another operation is needed to exit the setting screen. In short, the conventional operating scheme is inefficient.

An object of the invention is therefore to make setting operations more efficient.

SUMMARY OF THE INVENTION

In one aspect, the invention provides an information proceeding device including a storage unit, a display unit, an input unit, and a control unit. The storage unit stores a selection value indicating whether a predetermined setting is enabled or disabled and a setting value that applies when the setting is enabled. The display unit displays a setting screen concerning the predetermined setting. The input unit receives input of a switching instruction to switch to display of the setting screen in response to a control operation by a user. Even if the switching instruction is received while the selection value stored in the storage unit indicates that the predetermined setting is disabled, in response to the switching instruction the centred unit causes the display unit to display the setting screen and causes the selection value displayed on the setting screen to indicate that the predetermined setting is enabled.

In another aspect, the invention provides an information processing method that includes:
storing a selection value indicating whether a predetermined setting is enabled or disabled and a setting value that applies when the setting is enabled;
displaying a setting screen concerning the predetermined setting;
receiving input of a switching instruction to switch to display of the setting screen in response to a control operation by a user; and
causing the display unit to display the setting screen in response to the switching instruction and causing the selection value displayed on the setting screen to indicate that the predetermined setting is enabled, even if the switching instruction is received while the stored selection value indicates that the predetermined setting is disabled.

The invention makes setting operations more efficient when the user enters an instruction to display its setting screen.

BRIEF DESCRIPTION OF THE DRAWINGS

In the attached drawings:

FIG. 1 is a block diagram schematically illustrating the configuration of an information processing device according to an embodiment of the invention;

FIG. 2 schematically illustrates exemplary information stored in the storage unit in the embodiment;

FIG. 3 schematically illustrates a first exemplary copy function setting screen displayed on a touch panel in the embodiment;

FIG. 4 schematically illustrates a first exemplary edge erase setting screen displayed in the embodiment;

DETAILED DESCRIPTION OF THE INVENTION

Figure 5:
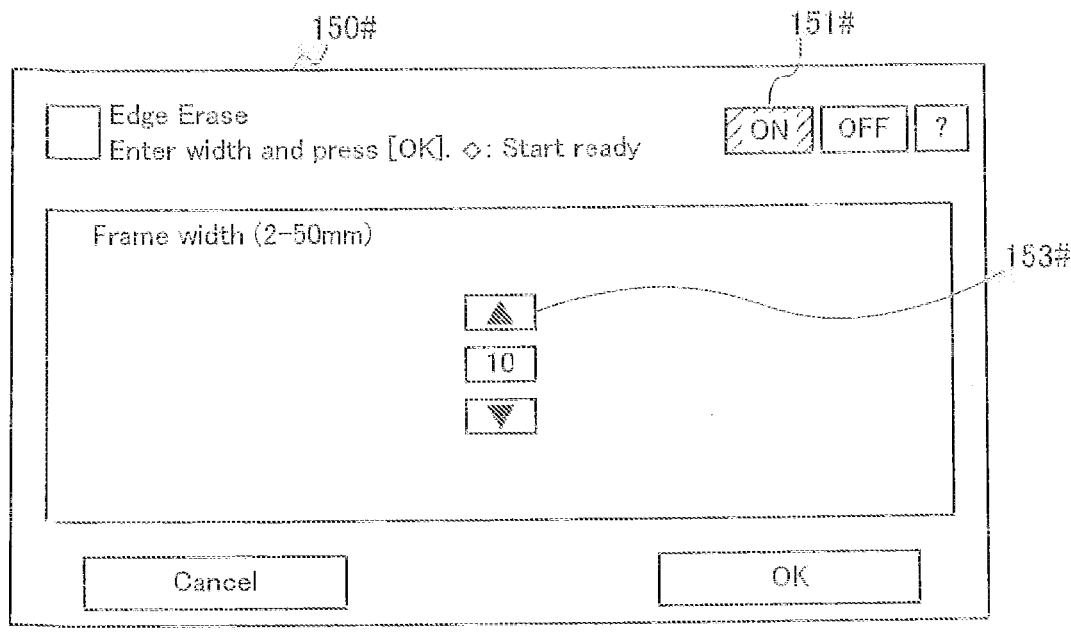
FIG. 5 schematically illustrates a second exemplary edge erase setting screen displayed in the embodiment.

An embodiment of the invention will now be described with reference to the attached drawings, in which like elements are indicated by like reference characters.

The block diagram in FIG. 1 schematically illustrates the configuration of the information processing device 100 in the embodiment. The information processing device 100 executes an information processing method which is also an embodiment of the invention.

The information processing device 100 includes a storage unit 110, a touch panel 120, and a control unit 130.

The storage unit 110 stores information needed in the operation of the information processing device 100.

The storage unit 110 includes a setting storage unit 111 and a display data storage unit 112.

The setting storage unit 111 stores setting information including a selection value indicating whether a predetermined setting is enabled or disabled and a setting value that applies when the selection value indicates that the setting is enabled. The predetermined setting relates to, for example, image forming or a power saving function.

An example of the setting information stored in the setting storage unit 111 is shown in FIG. 2. The setting information shown in this example is a setting table 111a relating to an edge erase function.

The edge erase function is a well known function that, when a copying operation is executed, converts the pixels within a predetermined distance from the edges to white pixels on the scanned image.

The setting table 111a includes an edge erase on/off field 111b, an edge erase width field 111c, a temporary edge erase on/off field 111d, and a temporary edge erase width field 111e.

The edge erase on/off field 111b stores an on/off value indicating whether the edge erase function is enabled or disabled as a selection value for edge erase function. The 'on' value indicates that the edge erase function is enabled; the 'off' value indicates that the edge erase function is disabled.

The edge erase width field 111c stores a value indicating the width of the region, measured from the edge of the image, in which the pixels are converted to white pixels (the edge erase frame width) as a setting value for edge erase function.

The temporary edge erase on/off field 111d stores a temporary edge erase on/off value for display on the setting screen. The value stored in the temporary edge erase on/off field 111d is used when she edge erase on/off value is changed on the seating screen.

The temporary edge erase width field 111e stores a temporary edge erase frame width for display on the setting screen. The value stored in the temporary edge erase width field 111e is used when the edge erase frame width is changed on the setting screen.

Referring again to FIG. 1, the display data storage unit 112 stores display data used for displaying screens on the touch panel 120. The display data include, for example, programs for drawing screens to be displayed on the touch panel 120 and partial image data to be incorporated into she screens displayed on the touch panel 120.

The touch panel 120 functions as a display unit for displaying screens and as an input unit for receiving input. For example, the touch panel 120 displays screen data generated by the control unit 130 and detects positions that are tapped or pressed (the term 'pressed' will be used below) with a resistive film. As described later, the touch panel 120 can receive an instruction to switch, to a setting screen related to a predetermined setting, and display that setting screen. On that setting screen, the touch panel 120 can also receive an enabled/disabled selection as a selection value of the setting, and when 'enabled' is selected as the selection value of at least that setting, can also input the setting value of that setting. When 'disabled' input as the selection value of the setting, the touch panel 120 switches from the setting screen to display some other screen. The other screen may be any screen on which input of a setting value for at least that setting is not accepted. For example, the other screen may be the screen that was displayed before or immediately before the setting screen was displayed, or a screen on which at least the predetermined setting can be selected from among a plurality of settings.

The control unit 130 controls processing in the information processing device 100. For example, the control unit 130 generates screen data by using the display data stored in the display data storage unit 112. The control unit 130 also sends the generated screen data to the touch panel 120, causes a screen to be displayed on the touch panel 120 on the basis of the display data, and accepts input through the screen. The control unit 130 thereby controls screen transitions on the touch panel 120 and, on the basis of user input, controls the execution of functions by a function execution unit (not shown). When the touch panel 120 receives input of an instruction to switch to the display of a setting screen related to the predetermined setting, even if the selection value stored in the storage unit 110 indicates 'disabled', the control unit 130 causes the touch panel 120 to display a setting screen on which the indicated selection value of the predetermined setting is 'enabled'. The non-illustrated function execution unit is, for example, an image forming unit that forms images on media such as paper.

An exemplary copy function setting screen displayed on the touch panel 120 is shown in FIG. 3. The illustrated copy function setting screen 140 has buttons 141-148, which are regions for selecting settings that concern the copy function. When one of these buttons 141-148 is pressed, the control unit 130 generates screen data for displaying a setting screen related to the setting corresponding to the pressed button. The control unit 130 sends the generated screen data to the touch panel 120, causing it to display the setting screen related to the selected setting.

FIG. 4 shows an example of an edge erase setting screen. This edge erase setting screen 150 is the screen displayed when the Edge Erase button 146 for selecting the edge erase function is pressed on the copy function setting screen 140 in FIG. 3. The edge erase setting screen 150 is used for switching the edge erase function on and off and setting the edge erase width.

The edge erase setting screen 150 has an ON button 151, an OFF button 152, an edge erase width increment button 153, an edge erase width decrement button 154, an edge erase width display region 155, an OK button 156, and a Cancel button 157.

The ON button 151 is a region used to select enabling she edge erase function. When the ON button 151 is pressed, the control unit 130 sets the temporary edge erase on/off field 111d in the setting table 111a in FIG. 2 to 'on'.

The OFF button 152 is a region used to select disabling the edge erase function. When the OFF button 152 is pressed, the control unit 130 sets the edge erase on/off field 111b in the setting table 111a in FIG. 2 to 'off', and returns the screen (150) displayed on the touch panel 120 to the copy function setting screen (140).

The edge erase width increment button 153 is an input region for an instruction to increase the edge erase width by '1'. When the edge erase width increment button 153 is pressed, the control unit 130 adds '1' to the value stored in the temporary edge erase width field 111e in the setting table 111a and adds '1' to the value displayed in the edge erase width display region 155.

The edge erase width decrement button 154 is an input region for an instruction to decrease the edge erase width by '1'. When the edge erase width decrement button 154 is pressed, the control unit 130 subtracts '1' from the value stored in the temporary edge erase width field 111e in the setting table 111a and subtracts '1' from the value displayed in the edge erase width display region 155.

The edge erase width display region 155 is a region in which the edge erase width value set on the edge erase setting screen 150 is displayed. The displayed value corresponds to the value stored in the temporary edge erase width field 111e in the setting table 111a.

The OK button 156 is an input region for an instruction to finalize the edge erase width value and the edge erase on/off value (always the 'on' value) displayed on the edge erase setting screen 150. When the OK button 156 is pressed, the control unit 130 copies the values stored in the temporary edge erase on/off field 111d and temporary edge erase width field 111e in the setting table 111a into the edge erase on/off field 111*b* and edge erase width field 111*c*, and returns the screen displayed on the touch panel 120 to the copy function setting screen.

The Cancel button 157 is an input region for an instruction that cancels the inputs that have been made on the edge erase setting screen 150. When the Cancel button 157 is pressed, the control unit 130 returns the screen displayed on the touch panel 120 to the copy function setting screen.

FIG. 5 schematically shows the edge erase setting screen 150# when the edge erase on/off value is 'on', that is, when the ON button 151# is in the selected state, and the edge erase width increment button 153# has been pressed, bringing the edge erase width value to '10'.

Figure 6:
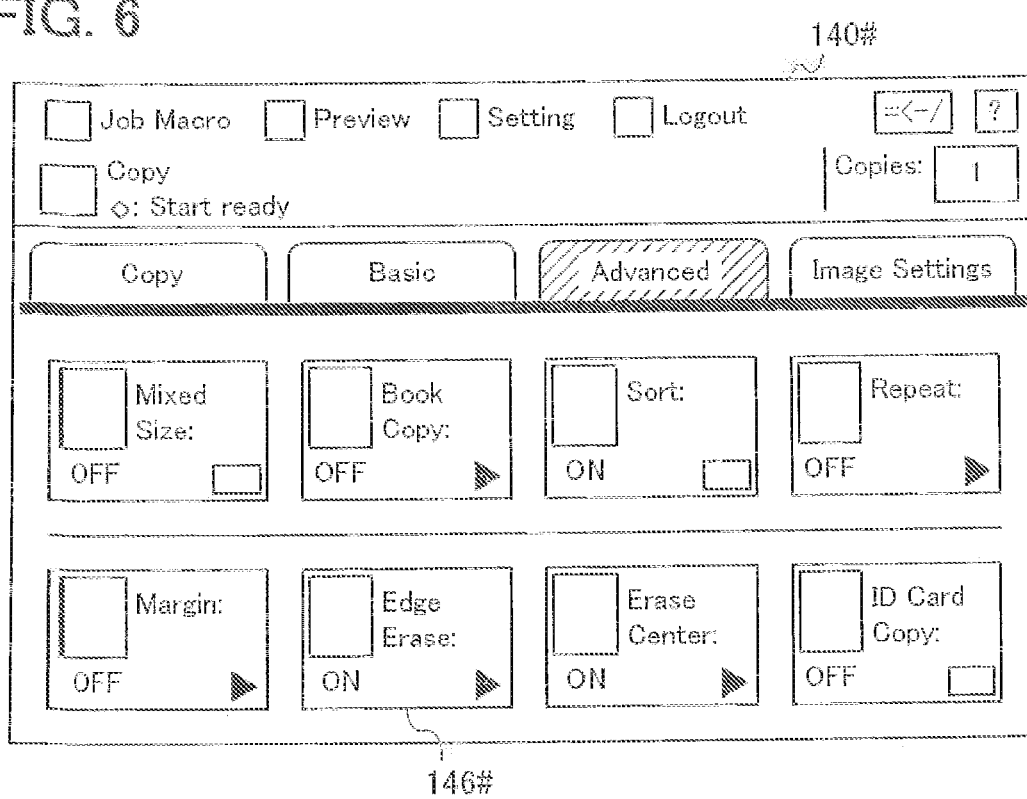
FIG. 6 schematically illustrates a second exemplary copy function setting screen displayed in the embodiment.

FIG. 6 schematically shows the copy function setting screen 140# redisplayed when, the OK button 156 is pressed while the edge erase on/off value is 'on' on the edge erase setting screen 150 shown in FIG. 4, 'ON' is displayed on the Edge Erase button 146# in FIG. 6 to indicate that the edge erase on/off value is 'on'.

The operation of setting up and displaying the edge erase setting screen will now be described with reference to the flowchart in FIG. 7. Initially, it will be assumed that the edge erase setting screen 1140 shown in FIG. 3 is displayed on the touch panel 120.

First, the control unit 130 determines whether the button 146 corresponding to the edge erase function has been pressed on the copy function setting screen 140 (step S10). When the button 146 corresponding to the edge erase function is pressed (Yes in step S10), the process proceeds to step S11.

In step S11, the control unit 130 determines whether the edge erase function is disabled. Specifically, the control unit 130 refers to the setting table 111*a* stored in the setting storage unit 111 and determines whether the value stored in the edge erase on/off field 111*b* is 'off'. If the value stored in the edge erase on/off field 111*b* is 'off' (Yes in step S11), the process proceeds to step S12. If the value stored in the edge erase on/off field 111*b* is 'on' (No in step S11), the process proceeds to step S13.

In step S12, in the setting table 111*a*, the control unit 130 sets the value stored in the temporary edge erase on/off field 111*d* to 'on', and copies the value stored in the edge erase width field 111*c* into the temporary edge erase width field 111*e*. When the information processing device 100 is powered on (to begin use), a predetermined value is stored in the edge erase width field 111*c*. The process then proceeds to step S14.

In step S13, the control unit 130 copies the value stored in the edge erase on/off field 111*b* into the temporary edge erase on/off field 111*d* in the setting table 111*a*, and copies the value stored in the edge erase width field 111*c* into the temporary edge erase width field 111*e*. The process then proceeds to step S14.

In step S14, the control unit 130 uses the display data stored in the display data storage unit 112 and setting table 111*a* to generate screen data for the edge erase setting screen 150, and sends the generated screen data to the touch panel 120. On the basis of the received screen data, the touch panel 120 displays the edge erase setting screen 150. Since the 'on' value is stored in the temporary edge erase on/off field 111*d*, the ON button 151 on the edge erase setting screen 150 is in the selected state. The edge erase width indicated by the value stored in the temporary edge erase width field 111*e* is displayed in the edge erase width display region 155.

Figure 7:
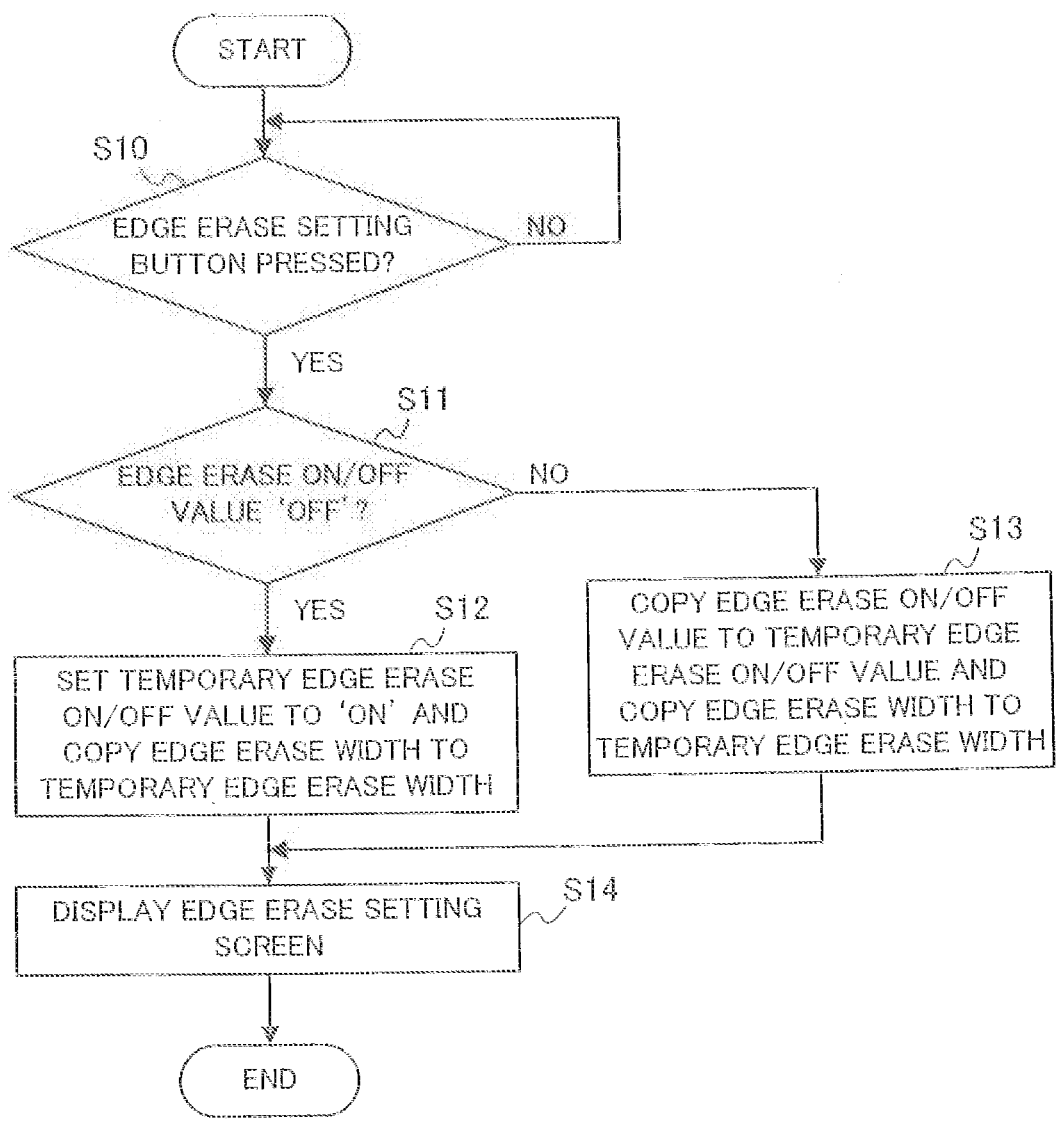
FIG. 7 is a flowchart illustrating the operation of setting up and displaying an edge erase setting screen in the embodiment.

According to the flowchart in FIG. 7, even when the edge erase function is in the disabled state, in other words, even when the 'off' value is stored in the edge erase on/off field 111*b* in the setting table 111*a*, the ON button 151 is displayed in the selected state, or the edge erase function is set to the 'on' state, when the edge erase setting screen 150 is displayed. The user is thereby relieved of the need to press the ON button 151 on the edge erase setting screen 150.

Operations performed on the edge erase setting screen will now be described with reference to FIG. 8. It will be assumed that the edge erase setting screen 150 shown in FIG. 4 is displayed on the touch panel 120.

In step S20, the control unit 130 determines whether a button has been pressed on the edge erase setting screen 150. When a button is pressed (Yes in step S20), the process proceeds to step S21.

In step S21, the control unit 130 determines whether the pressed button is the edge erase width increment button 153. If the pressed button is the edge erase width increment button 153 (Yes in step S21), the process proceeds to step S22. If the pressed button is not the edge erase width increment button 153 (No in step S21), the process proceeds to step S23.

In step S22, the control unit 130 carries out an edge erase width increment process. This process will be described laser using FIG. 9.

In step S23, the control unit 130 determines whether the pressed button is the edge erase width decrement button 154. If the pressed button is the edge erase width, decrement button 154 (Yes in step S23), the process proceeds to step S24. If the pressed button is not the edge erase width decrement button 154 (No in step S23), the process proceeds to step S25.

In step S24, the control unit 130 carries out an edge erase width decrement process. This process will be described later using FIG. 10.

In step S25, the control unit 130 determines whether the pressed button is the OK button 156. If the pressed button is the OK button 156 (Yes in step S25), the process proceeds to step S26. If the pressed button is not the OK button 156 (No in step S25), the process proceeds to step S27.

In step S26, the control unit 130 carries out a finalization process. This process will be described later using FIG. 11.

In step S27, the control unit 130 determines whether the pressed button is the OFF button 152. If the pressed button is the OFF button 152 (Yes in step S27), the process proceeds to step S28. If the pressed button is not the OFF button 152 (No in step S27), which means that the Cancel button 157 has been pressed, so the process proceeds to step S29.

In step S28, the control unit 130 carries out a disabling process or 'off' process. This process will be described later using FIG. 12.

In step S29, the control unit 130 clears the edge erase setting screen from the touch panel 120, and causes the touch panel 120 to return to the display of the copy function setting screen 140. Specifically, the control unit 130 uses the display data stored in the display data storage unit 112 and the setting table 111*a* to generate the screen data for the copy function setting screen and sends the generated screen data to the touch panel 120. On the basis of the received screen data, the touch panel 120 displays the copy function setting screen.

Figure 9:
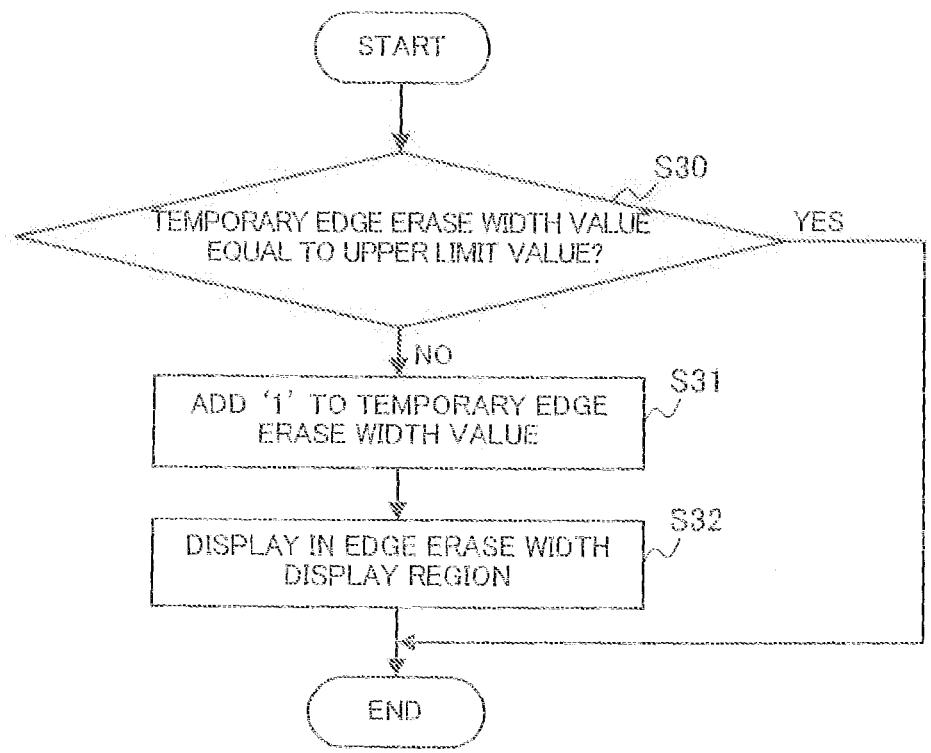
FIG. 9 is a flowchart illustrating an edge erase width increment process carried out in the embodiment.

The edge erase width increment process will now be described with reference to FIG. 9.

In step S30, the control unit 130 tests the value stored in the temporary edge erase width field 111*e* in the seating table 111*a* stored in the setting storage unit 111. If this value is equal to a predetermined threshold value representing the upper limit of the edge erase width (Yes in step S30), the control unit 130 does nothing and the process proceeds to step S20 in FIG. 8. If this value is less than the threshold value representing the upper limit or the edge erase width (No in step S30), the process proceeds to step S31.

In step S31, the control unit 130 adds '1' to the value stored in the temporary edge erase width field 111e in the setting table 111a.

Next, in step S32, the control unit 130 causes the edge erase width display region 155 in the edge erase setting screen 150 to display the value stored in the temporary edge erase width field 111e in the setting table 111a. The process then proceeds to step S20 in FIG. 8.

Figure 10:
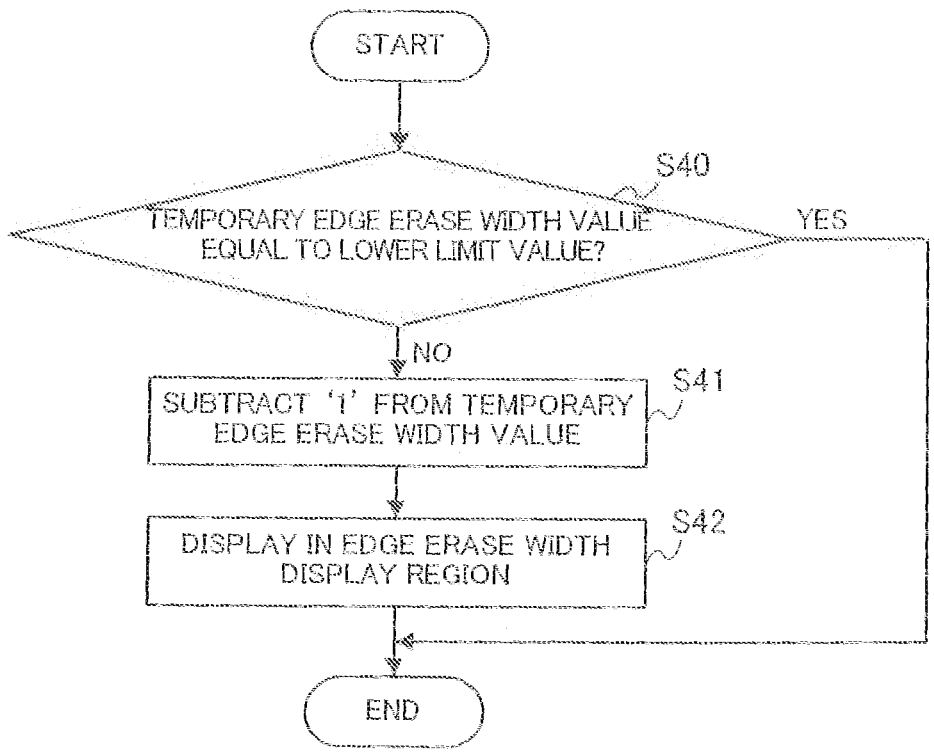
FIG. 10 is a flowchart illustrating an edge erase width decrement process carried out in the embodiment.

The edge erase width decrement process will now be described with reference to FIG. 10.

In step S40, the control unit 130 tests the value stored in the temporary edge erase width field 111e in the setting table 111a stored in the setting storage unit 111. If this value is equal to a predetermined threshold value representing the lower limit of the edge erase width (Yes in step S40), the control unit 130 does nothing and the process proceeds to step S20 in FIG. 8. If this value is greater than the threshold value representing the lower limit of the edge erase width (No in step S40), the process proceeds to step S41.

In step S41, the control unit 130 subtracts '1' from the value stored in the temporary edge erase width field 111e in the setting table 111a.

Next, in step S42, the control unit 130 causes the edge erase width display region 155 in the edge erase setting screen 150 to display the value stored in the temporary edge erase width field 111e in the setting table 111a. The process then proceeds to step S20 in FIG. 8.

Figure 11:
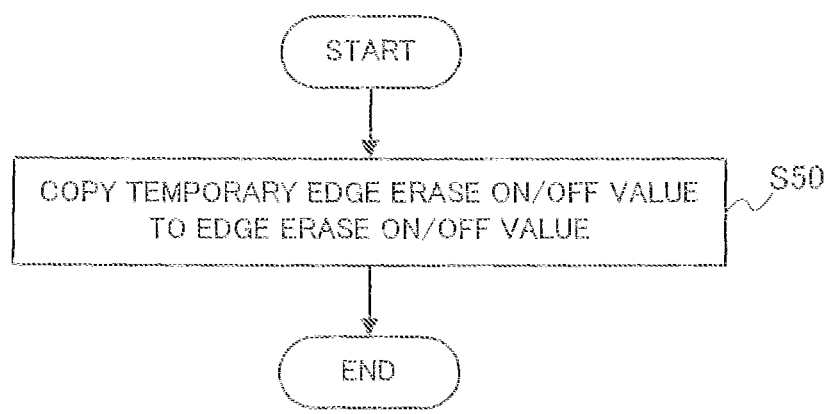
FIG. 11 is a flowchart illustrating a finalization process carried out in the embodiment.

The finalization process will now be described with reference to FIG. 11.

In step S50, in the setting sable 111a stored in the setting storage unit 111, the control unit 130 copies the value stored in the temporary edge erase on/off field 111d into the edge erase on/off field 111b, and copies the value in the temporary edge erase width field 111e into the edge erase width field 111c. The process then proceeds to step S29 in FIG. 8.

The disabling or 'off' process will now be described with reference to FIG. 12.

In step S60, the control unit 130 sets the 'off' value in the edge erase on/off field 111b in the setting table 111a stored in the setting storage unit 111. The process then proceeds to step S29 in FIG. 8.

Figure 8:
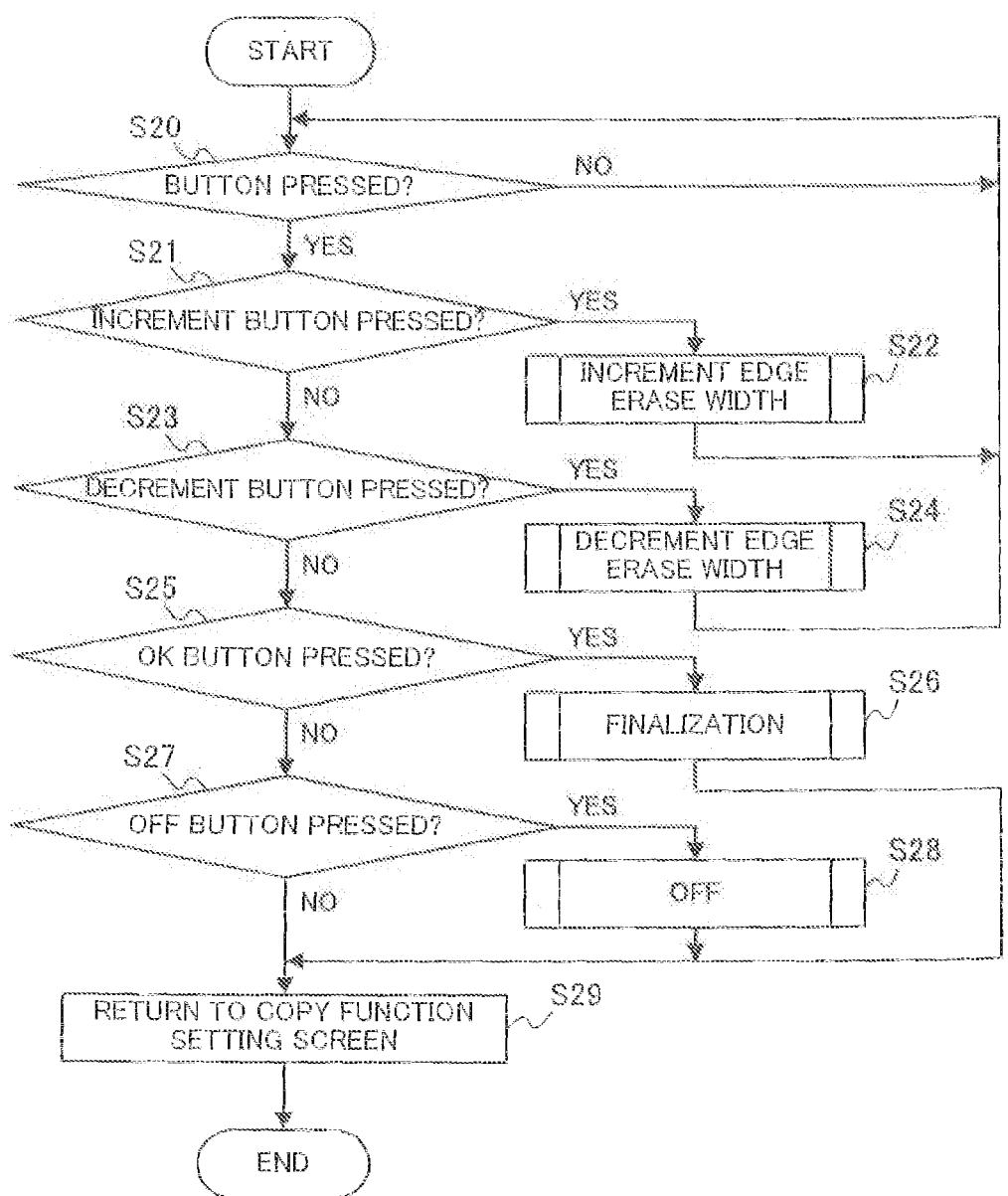
FIG. 8 is a flowchart illustrating operations carried out on the edge erase setting screen in the embodiment.
Figure 12:
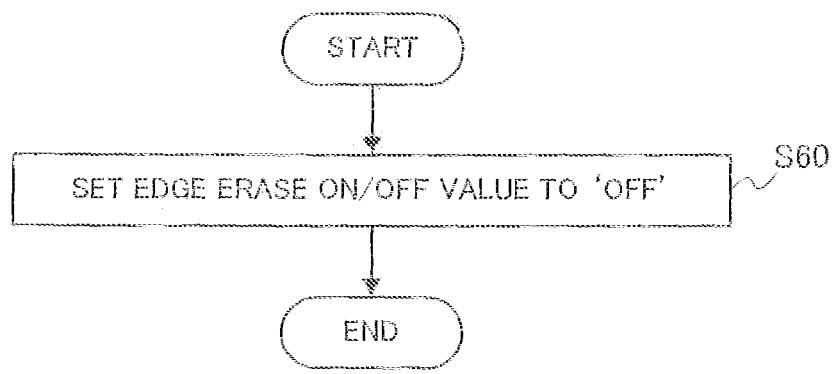
FIG. 12 is a flowchart illustrating a disabling process carried out in the embodiment.

According to the flowcharts in FIGS. 8 and 12, when the OFF button 152 is pressed on the edge erase setting screen 150, the touch panel 120 returns to the display of the copy function setting screen without the need for any further operations, such as pressing the OK button 156, by the user.

According to the embodiment described above, even when the edge erase on/off value on the copy function setting screen is 'off', if the button corresponding to the edge erase function is pressed, the edge erase setting screen 150 on which the edge erase on/off value is changed to 'on' without the need for any operation by the user is displayed, and if the user changes the edge erase on/off value on the edge erase setting screen to 'off', the edge erase setting screen 150 is immediately closed to display copy function setting screen 140, so the operation of the information processing device becomes more efficient.

The information processing device in the embodiment described above is, for example, a printer, copier, multifunction printer, facsimile machine, or the like.

The exemplary touch panel in the embodiment described above is a touch panel of the resistive film type, but a capacitive touch panel may be used instead.

In the embodiment described above, the predetermined setting sets an edge erase function that leaves a margin at the edges of a medium on which an image is formed, the selection value is the value for selecting whether or not to enable the edge erase function, and the setting value is the width of the margin when the edge erase function is enabled, but these particulars are exemplary and not limiting.

For example, the predetermined setting may set a sleep function that, when the information processing device is not used for a time exceeding a predetermined threshold time, causes a transition of the information processing device to a power saving mode; the selection value for the predetermined setting may be a value for selecting whether the sleep function is enabled or disabled; and the setting value of the predetermined setting may be a value indicating the threshold time that applies when the sleep function is enabled. The power saving mode is a mode in which the information processing device 100 consumes less amounts of power than in the normal mode in which the information processing device 100 can process information.

Alternatively, the predetermined setting may set a repeat function that maps an image scanned from a single original document onto multiple locations on a single medium (e.g., a single sheet of paper); the selection value for the predetermined setting may be a value for selecting whether the repeat function is enabled or disabled; and the setting value of the predetermined setting may be a value indicating the repeat count when the repeat function is enabled, e.g., '2UP' to form two images or '4UP' to form four images on the medium.

As another alternative, the predetermined setting may set a binding margin function that leaves a binding margin; the selection value for the predetermined setting may be a value for selecting whether the binding margin function is enabled or disabled; and the setting value of the predetermined setting may be a value indicating the width of the binding margin when the binding margin function is enabled.

According to the flowcharts in FIG. 7, if in step S11 the selection value is 'off' (Yes in step S11), in step S12 the control unit 130 copies the value the edge erase width field 111e indicating the value set before into the temporary edge erase width field 111e and the copied value is displayed as an initial value on the edge erase setting screen 150. Alternatively, in step S12 the control unit 130 may reset the temporary edge erase width field 111e, or the edge erase width field 111e and the temporary edge erase width field 111e, to a predetermined initial value such as '0' and the predetermined initial value may be displayed as an initial value on the edge erase setting screen 150.

According to FIG. 6, when the edge erase on/off value is 'on', information indicating that the predetermined setting is enabled, such as 'ON', is displayed on the Edge Erase button 146#. Alternatively, the edge erase width may be displayed next to 'ON' on the Edge Erase button 146#. For example, information such as 'ON (10 mm)' may be displayed on the Edge Erase button 146#.

Those skilled in the art will recognize that further variations are possible within the scope of the invention, which is defined in the appended claims.

What is claimed is:

1. An information processing device comprising:
   a storage unit that stores a selection value indicating whether a predetermined setting is enabled or disabled and a setting value that applies when the predetermined setting is enabled;
   a display unit that displays a first screen and a second screen, the first screen indicating whether the predetermined setting is enabled or disabled, the second screen being displayed when the predetermined setting is selected on the first screen and indicating a setting state of the predetermined setting;

an input unit that receives input of an instruction for selecting the predetermined setting on the first screen; and a control unit that, if the instruction is received on the first screen indicating that the predetermined setting is disabled, causes the display unit to display the second screen indicating an enable state as the setting state and the setting value.

2. The information processing device of claim 1, wherein the first screen is a screen on which the predetermined setting can be selected from among a plurality of settings.

3. The information processing device of claim 2, wherein:
the first screen has a region for selecting the predetermined settings; and
when the selection value indicates that the predetermined setting is enabled, information indicating that the predetermined setting is enabled is displayed in the region.

4. The information processing device of claim 3, wherein the information further indicates the setting value.

5. The information processing device of claim 1 wherein, when enabled is selected as the selection value of at least the predetermined setting on the second screen, the input unit accepts input of the setting value of the predetermined setting.

6. The information processing device of claim 5, wherein an initial value of the setting value is a value set before.

7. The information processing device of claim 1, wherein the predetermined setting relates to image forming.

8. The information processing device of claim 7, wherein:
the predetermined setting sets an edge erase function for leaving a margin at edges of a medium on which an image is formed;
the selection value for the predetermined setting is a value for selecting whether the edge erase function is enabled or disabled; and
the setting value of the predetermined setting is a value indicating a size of the margin when the edge erase function is enabled.

9. The information processing device of claim 1, wherein the setting relates to a power saving function.

10. The information processing device of claim 9, wherein:
the predetermined setting sets a sleep function that, when the information processing device is not used for a time exceeding a predetermined threshold time, causes a transition of the information processing device to a power saving mode;
the selection value for the predetermined setting is a value for selecting whether the sleep function is enabled or disabled; and
the setting value of the predetermined setting is a value indicating the threshold time, when the sleep function is enabled.

11. An information processing method comprising:
storing a selection value indicating whether a predetermined setting is enabled or disabled and a setting value that applies when the predetermined setting is enabled;
displaying a first screen and a second screen, the first screen indicating whether the predetermined setting is enabled or disabled, the second screen being displayed when the predetermined setting is selected on the first screen and indicating a setting state of the predetermined setting;

receiving input of an instruction for selecting the predetermined setting on the first screen; and causing the second screen indicating an enabled state as the setting state and the setting value to be displayed, following the instruction on the first screen indicating that the predetermined setting is disabled.

12. The information processing device of claim 1, wherein the second screen is displayed in place of the first screen.

13. The information processing device of claim 1, wherein:
the second screen includes a first region used to input a selection of enabled for the predetermined setting and a second region used to input a selection of disabled for the predetermined setting; and
if the instruction is received on the first screen indicating that the predetermined setting is disabled, the control unit causes the display unit to display the second screen indicating a state that the first region is selected.

14. The information processing device of claim 1, wherein:
the second screen includes a first region used to input a first selection of enabled for the predetermined setting and a second region used to input a second selection of disabled for the predetermined setting; and
if the input unit receives input of the second selection, the control unit causes the display unit to switch the second screen to the first screen indicating that the predetermined setting is disabled.

15. The information processing device of claim 1, wherein:
the second screen includes a first region used to input a first instruction for cancelling the setting value and a second region used to input a second instruction for finalizing the setting value; and
if the input unit receives input of the first instruction, the control unit causes the display unit to switch the second screen to the first screen indicating that the predetermined setting is disabled.

16. The information processing device of claim 1, wherein:
the second screen includes a first region used to input a first instruction for cancelling the setting value and a second region used to input a second instruction for finalizing the setting value; and
if the input unit receives input of the second instruction, the control unit causes the display unit to switch the second screen to the first screen indicating that the predetermined setting is enabled.

17. The information processing device of claim 1, wherein if the instruction is received on the first screen indicating that the predetermined setting is enabled, the control unit causes the display unit to display the second screen indicating that the predetermined setting is enabled and indicating the setting value.

18. The information processing device of claim 17, wherein:
the second screen includes a first region used to input a first selection of enabled for the predetermined setting and a second region used to input a second selection of disabled for the predetermined setting; and
if the input unit receives input of the second selection, the control unit causes the display unit to switch the second screen to the first screen indicating that the predetermined setting is disabled.

19. The information processing device of claim 17, wherein:

the second screen includes a first region used to input a first instruction for cancelling the setting value and a second region used to input a second instruction for finalizing the setting value; and if the input unit receives input of the first instruction or the second instruction, the control unit causes the display unit to switch the second screen to the first screen indicating that the predetermined setting is enabled.

\* \* \* \* \*